United States Patent [19]

Sano et al.

[11] Patent Number: 4,491,693

[45] Date of Patent: Jan. 1, 1985

[54] KEY TELEPHONE SYSTEM AND METHOD OF SETTING OPERATING DATA IN THE KEY TELEPHONE SYSTEM

[75] Inventors: Yoshikazu Sano; Hideyasu Mori, both of Hino; Yasuji Sato, Hachiouji, all of Japan

[73] Assignee: Tokyo Shibaura Denki Kabushiki Kaisha, Kanagawa, Japan

[21] Appl. No.: 444,529

[22] Filed: Nov. 26, 1982

[30] Foreign Application Priority Data

Nov. 26, 1981 [JP] Japan .............................. 56-188299

[51] Int. Cl.³ .............................................. H04Q 5/18
[52] U.S. Cl. .................................................. 179/99 R
[58] Field of Search .............. 179/99 R, 81 R, 99 LS, 179/99 M, 99 P, 18 ES, 2 A, 2 R, 2 DP, 175.2 C, 175.2 R

[56] References Cited

U.S. PATENT DOCUMENTS 4,203,011 5/1980 Coviello ........................... 179/99 M

FOREIGN PATENT DOCUMENTS 116008 3/1977 Japan .

OTHER PUBLICATIONS

TIE Catalogue, "Meritor EK-4/5", published Nov. 1980.
NEC Technological Report, vol. 37, No. 7, 1982, p. 15.

Primary Examiner—Stafford D. Schreyer
Attorney, Agent, or Firm—Finnegan, Henderson, Farabow, Garrett & Dunner

[57] ABSTRACT

This system is a key telephone system of a type setting operating data for controlling the operations of respective key telephone sets and the entire system by using the keys of the key telephone sets. This key telephone system has a plurality of key telephone sets and a main unit, and the main unit has first and second memories for storing the operating data. The main unit takes the first mode for operating the system in accordance with the operating data of the first memory and the second mode for setting the operating data. The second memory stores the reference operating data and transfers the data into the first memory as required.

20 Claims, 5 Drawing Figures

KEY TELEPHONE SYSTEM AND METHOD OF SETTING OPERATING DATA IN THE KEY TELEPHONE SYSTEM

BACKGROUND OF THE INVENTION

1. Field of the Invention

This invention relates to a key telephone system which can readily set operating data used for system operations and a method of setting the operating data in the key telephone system.

When installing a key telephone system, operation requirements are specified by the user of the system, and data for operating the system, which is called "operating data" are set in accordance with the requirements. This operating data provides information for the telephone system operation such as, for example, an operational rule that the corresponding telephone set rings when a ringing signal comes in at a certain office line, or a rule that, for a certain telephone set, outgoing calls can be made from the telephone set through a predetermined office line but cannot come in or go out through another office line in case that a plurality of office lines are connected to and a plurality of telephone sets are provided in the telephone system. These operating data are set to meet the key telephone system user's requirements.

2. Description of the Prior Art

Various methods have heretofore been employed for setting the above-described operating data.

For example, in a multi-wired key telephone system, the system is constructed in a predetermined configuration on a permanent basis by lap cutting or soldering. In an electronic key telephone system, a switch board provided with dip switches is disposed in a main unit, and data obtained from the main unit are used as operating data. In an electronic switching system, operating data are set from a teletypewriter.

However, such key telephone system is fixed in its operation since soldering or lap cutting are employed in its installation. Therefore, it is a complicated process to alter the initial operation of the system at a later date. Further, in case of the switch board, where multi-functional key telephone system is required, the number of switches increases as the operating data increases, resulting in increased cost and a more complicated installation process. In case of setting operating data through the teletypewriter, it is necessary to transport the teletypewriter to every installation site and every time alteration of the system is required. Since the teletypewriter is not required for normal operation of the key telephone system, providing it at the time of every setting of operating data is inconvenient and results in increased inconvenience and cost.

SUMMARY OF THE INVENTION

Accordingly, an object of this invention is to provide a method of setting operating data in a key telephone system in which the system is not fixedly established, nor a particular equipment is required, and setting input data as operating data can be easily performed.

According to this invention, operating data are set by utilizing keys of a key telephone set.

In this invention, a main unit comprises a first switch to enable switch selection of either a normal operating mode and an operating data setting mode, a first memory for storing operating data, and a main control circuit for allowing data inputted by the operation of a specific key telephone set (one or more sets may be employed) as operating data in the first memory in accordance with the state of the first switch. Thus, according to the key telephone system of this invention, data set by the specific telephone set can be used as operating data.

According to this invention, it is not necessary to employ a special switch board or teletypewriter for setting operating data but rather enables an ordinary telephone set or sets to be used as the specific input means for setting operating data. Therefore, it is less expensive than in the case of employing the switch board, and it can readily prepare and conduct its installation work since the work of carrying the teletypewriter to the cite is eliminated.

Further, data meeting the average user's requirements can be stored in advance in a second memory, and can be transferred as operating data into the first memory by means of a second switch, and by performing only a necessary change in operating data according to the requirements of a particular user, the setting work can be efficiently performed.

An embodiment of the invention will now be described in detail with reference to the attached drawings.

DESCRIPTION OF THE PREFERRED EMBODIMENTS

Figure 1:
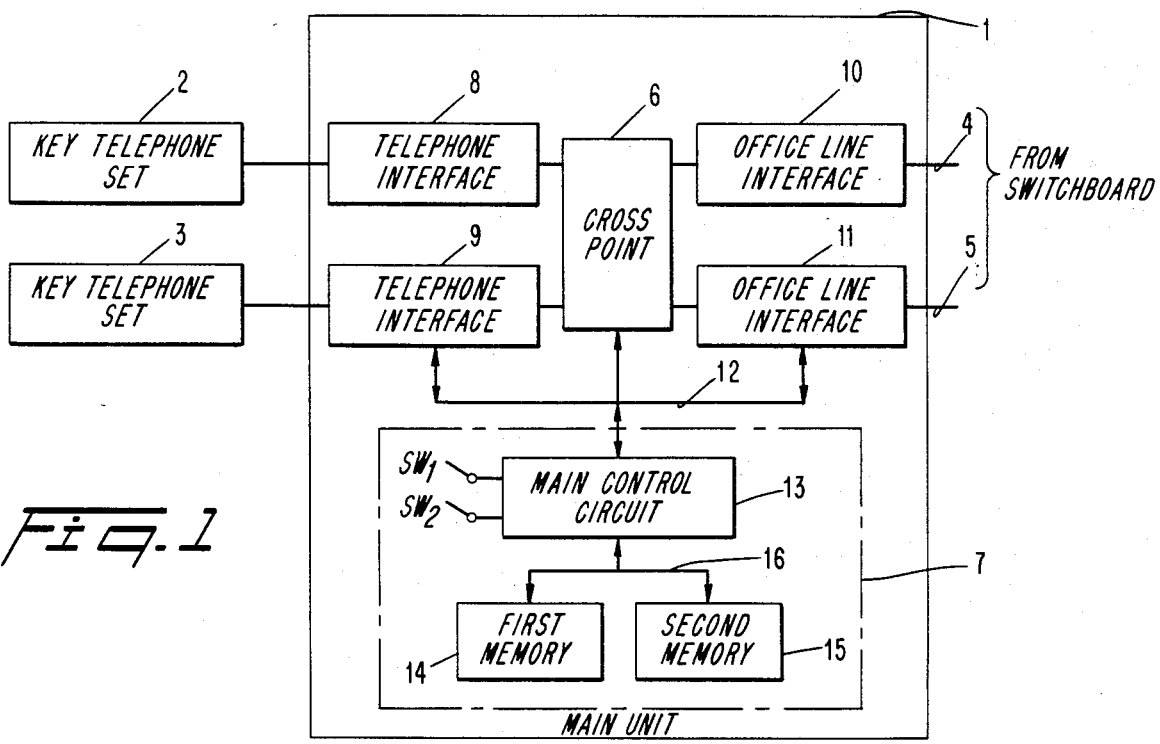
FIG. 1 is a schematic block diagram of an embodiment of a key telephone system according to the present invention.

Referring to FIG. 1, two telephone sets 2 and 3 are connected to a main unit 1, and two office lines 4 and 5 extend from a switching system (not shown).

The main unit 1 comprises a cross point 6, a control circuit 7, telephone set interfaces 8 and 9, and office line interfaces 10 and 11. The telephone interfaces 8 and 9 are respectively connected between the cross point 6 and the telephone sets 2 and 3. The office line interfaces 10 and 11 are respectively connected between the cross point 6 and the office lines 4 and 5.

The cross point 6, the telephone interfaces 8 and 9, and the office line interfaces 10, 11 are connected through a bus 12 to the control circuit 7, and are controlled by the control circuit 7.

The control circuit 7 includes a main control circuit 13, a first memory 14, a second memory 15, a first switch $SW_1$, and a second switch $SW_2$.

The main control circuit 13 performing processor functions, is connected to the first and second switches $SW_1$ and $SW_2$ to detect the states of the switches $SW_1$ and $SW_2$, and to control the respective components of the main unit 1 by using a program stored in the first and second memories 14 and 15 connected through an internal bus 16.

At least in the first memory 14, operating data for controlling operations of the main control circuit 13 are stored and in the second memory 15 reference operating data corresponding to the operating data, a program for operating the main control circuit 13 as a processor and data not necessarily for a direct operation are stored in advance. The reference operating data stored in advance are operating data of standard specifications, and when the key telephone system is operated in accordance with this reference operating data, the key telephone system can be configured for a variety of users of different operation requirements.

Figure 2:
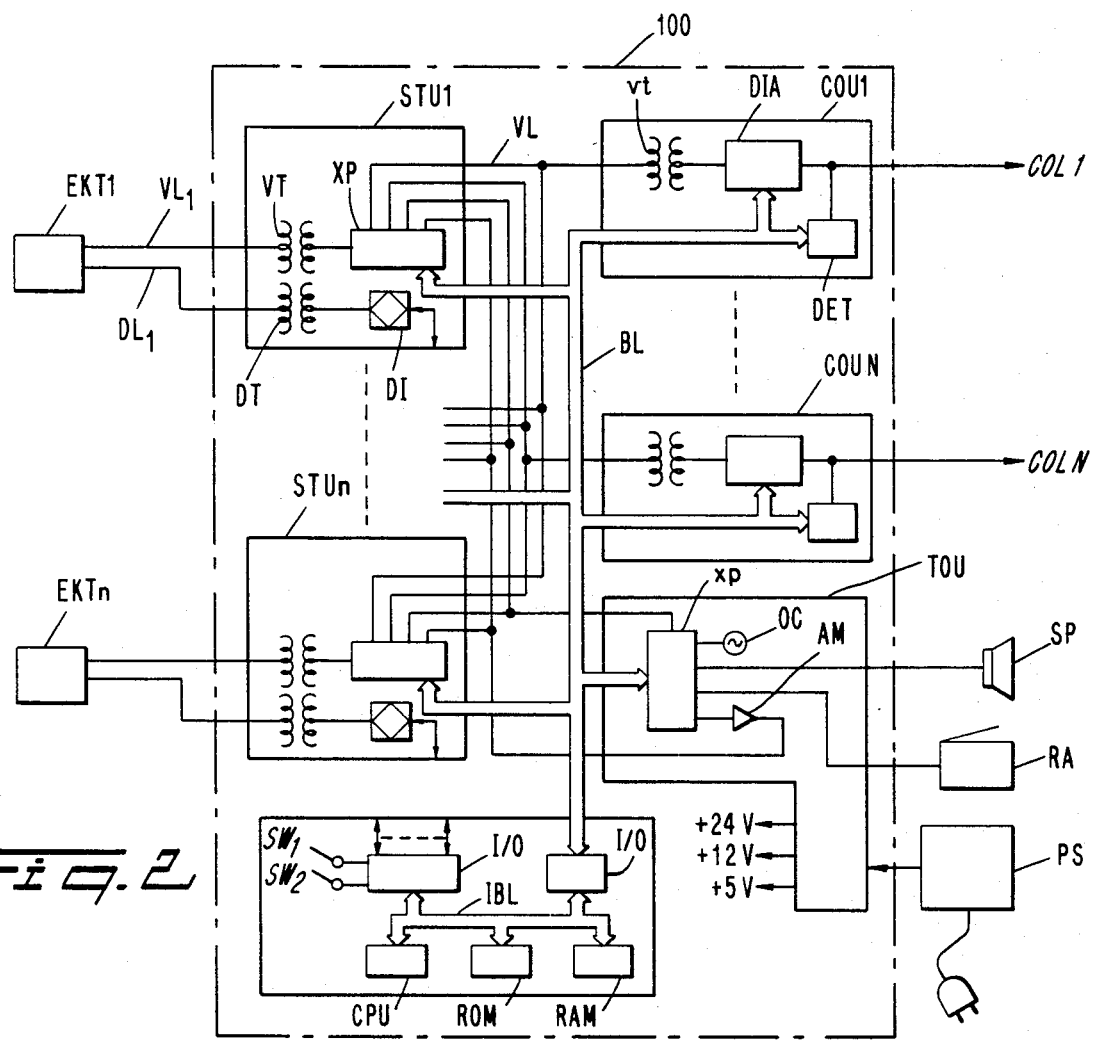
FIG. 2 is a more detailed schematic block diagram showing a preferred circuit arrangement according to the present invention.

Referring to the diagram shown in FIG. 2, a plurality of key telephone sets EKT1 to EKTn are connected to a main unit 100, and a plurality of office lines $COL_1$ to $COL_N$ connect with a switching system (not shown). The main unit 100 corresponds to the main unit 1 in FIG. 1, and has a plurality of station units $STU_1$ to $STU_n$ which are respectively associated with the key telephone sets $EKT_1$ to $EKT_n$, a plurality of central office line units $COU_1$ to $COU_N$ which are respectively associated with the office lines $COL_1$ to $COL_N$, a tone oscillation unit TOU, and a central control unit CCU. The station units $STU_1$ to $STU_n$ respectively connect the key telephone sets to the office lines or other key telephone sets or the other equipments. Each of the station units $STU_1$ to $STU_n$ has a voice signal transformer VT, a data transformer DT, a cross point XP, and a data interface DI. A voice signal inputted through a voice signal line $VL_1$ from a key telephone set is led through the voice signal transformer VT to the cross point XP, and data inputted through the data line $DL_1$ from a key telephone set is delivered through the data transformer DT and the data interface DI to the central control unit CCU which will be described later. The section including the voice signal transformer VT, the data transformer DT and the data interface DI corresponds to the telephone set interfaces 8 and 9 in FIG. 1, and the cross point XP corresponds to a part of the cross point 6 in FIG. 1.

Each of the central office line units $COU_1$ to $COU_N$ has a voice signal transformer vt, a dial signal oscillation circuit DIA, and an incoming signal detector circuit DET. The dial signal oscillation circuit DIA is connected through the voice signal transformer vt to the cross point XP of the station unit, and the incoming signal detector circuit DET is connected to the corresponding office line to detect the incoming signal from the office line. The central office line units $COU_1$ to $COU_N$ correspond to the office line interfaces 10, 11 in FIG. 1.

The tone oscillation unit TOU (having no corresponding unit in FIG. 1) includes an oscillator OC which generates a ringing tone, an extension cross point xp and an extension amplifier AM, and mainly functions to generate a ringing tone and control the connection of the extension. An external paging speaker SP and a radio RA which broadcasts music during holding times are connected to the cross point xp of the tone oscillation unit TOU. A power supply PS is connected to the tone oscillation unit TOU to supply power of 24 V, 12 V and 5 V for driving the respective sections.

The central control unit CCU corresponds to the control circuit 7 in FIG. 1. A microcomputer is employed for the central control unit CCU, which has a central processing unit CPU, a read-only memory ROM, a random-access memory RAM, an input/output interface I/O, and internal bus lines IBL connecting between these units. The central control units CCU is connected through the bus line BL to the cross points XP of the station units $STU_1$ to $STU_n$, the dial signal generators DIA and the incoming signal detectors DET of the central office units $COU_1$ to $COU_n$ and the cross point xp of the tone oscillation unit TOU, and control the operations of the respective units. In the central control unit CCU, a part of the random access memory RAM corresponds to the first memory in FIG. 1, and a part of the read-only memory ROM corresponds to the second memory in FIG. 1.

Figure 3:
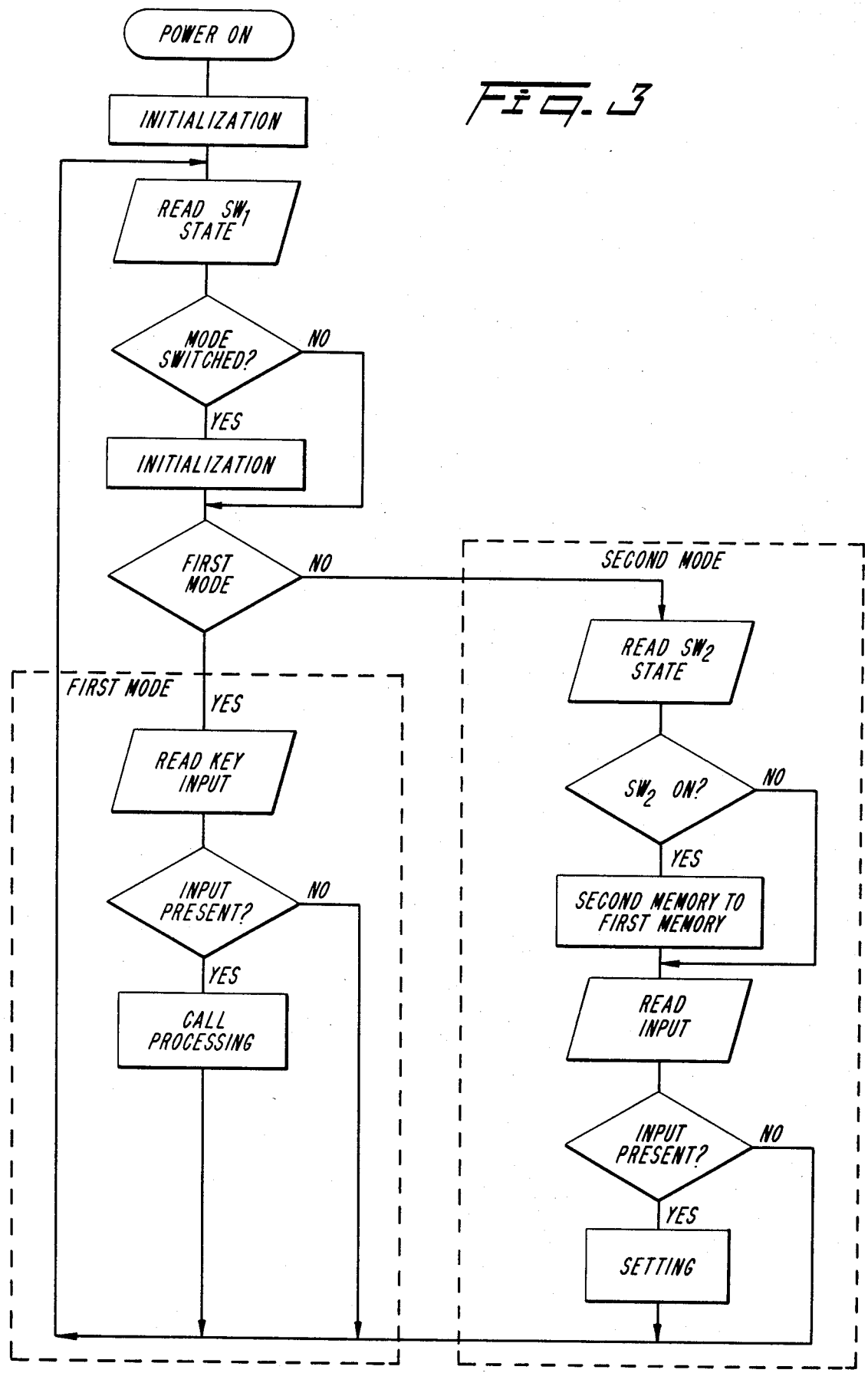
FIG. 3 is a flowchart showing operational steps employed in the key telephone system of FIG. 1.

The key telephone system thus constructed as described above is operated in accordance with steps as shown in a flowchart of FIG. 3. This operation will be described with reference to FIGS. 1 and 3. In FIG. 1, a program which executes the operation shown in the flowchart of FIG. 3 is stored in the second memory 15, and the main control circuit 13 performs processing in accordance with the program.

The operation of the key telephone system thus constructed will now be described. The key telephone system is operated in accordance with the flowchart in FIG. 3 and starts operating in the step "Power on". In the step "initialization", the main control circuit 13 performs predetermined initialization operations. The initialization to be performed here includes resetting of the registers in the main control circuit 13. When initialization is completed, the main control circuit 13 detects the state of the first switch $SW_1$ in the step of the "Read $SW_1$ State". Then, the main control circuit 13 identifies whether or not the switch $SW_1$ is in a mode different from that detected during the previous cycle in the step "Mode Switched?". If the mode is switched, the main control circuit 13 performs a further step of "initialization". This "initialization" step resets the contents of the registers and the flags used previously in the main control circuit 13 and disconnect the lines of the respective telephone sets so as to provide a new mode.

When either the second step of "initialization" is finished or the "Mode Switched?" step branches to NO, the step "First Mode?" is performed. More specifically, the main control circuit 13 judges whether the first switch $SW_1$ is ON or OFF, and if the first switch $SW_1$ is OFF, this step branches to "YES" to perform in the ordinary operation mode. If the first switch $SW_1$ is ON, this step branches to No and executes the operating data setting mode of the second mode.

Suppose the first switch $SW_1$ is OFF and this step is branched to the ordinary operating mode, then the main control circuit 13 carries out the step of the "Read Key Input". In other words, the main control circuit 13 receives information such as a key input or ON-hook or OFF-hook from key telephone set 2 or 3. Subsequently, the main control circuit 13 identifies the presence or absence of the input of the above-described information in the step of the "Input Present?". When this step is branched to YES, the main control circuit 13 performs necessary processes for the inputted information in the step of "Call Processing" and thereafter reenters the process sequence in accordance with the flowchart at the step "Read $SW_1$ State". If the step is branched to NO in previous step of the "Input Present?", the main control circuit 13 skips "Call Processing" and reenters the flowchart sequence at the step of the "Read $SW_1$ State".

As shown in the above description, the step "Second Memory To First Memory" is executed when the second switch $SW_2$ is turned on while the first switch $SW_1$ is also on. However, the system may also be designed so as to executed the step "Second Memory To First Memory" when the first switch $SW_1$ is turned on while the second switch $SW_2$ is on. In other words, it may be so designed that this step is executed only when both of the switches are on. By this, a write operation does not take place through inadvertent operation of the switch $SW_2$ and therefore the write operation requires more intentional action.

The above-described processes based on the flowchart are the ordinary operating mode. This operation will be described by describing an example. The following operation mainly corresponds to the step of the "ringing process" of the flowchart in FIG. 3.

When a ringing signal is received from the office line 4, the main control circuit 13 detects the incoming of the ringing signal through the office line interface 10 and the bus 12. Then, the main control circuit 13 displays the call indication on an indicator LED (not shown) corresponding to the office line 4 in the key telephone sets 2 and 3, and makes ringing to tell that there is an incoming call for the key telephone sets 2 and 3 while referring to the operating data stored in the first memory 14 as the data (e.g., if the ringing is to be made only for the key telephone set 2 in the operating data, only the telephone set 2 rings). Both telephone sets can answer in the ordinary key telephone system, and in this case it is assumed that the key (not shown) in the telephone set 2 corresponding to the office line 4 is depressed and answered. The data produced by the depression of the key is fed from the telephone set 2 through the telephone interface 8 and the bus 12 to the main control circuit 13. Then, the main control circuit 13 connects the office line 4 to the office line interface 10, and the telephone set 2 to the telephone interface 8, and further operates the cross point 6 to connect the telephone interface 8 to the office line interface 10. In this manner, the connection of the telephone set 2 to the office line 4 is completed. Signals are respectively sent through the telephone interfaces 8 and 9 from the main control circuit 13 to the LED (not shown) in the telephone sets 2 and 3, and the office line 4 "busy" indication is displayed.

Now, the operation during an outgoing call period will be described. Assume that an outgoing call is originated to the office line 5 from the key telephone set 3. When the key (not shown) in the key telephone set 3 corresponding to the office line 5 is first depressed, this data is sent through the telephone interface 9 and the bus 12 to the main control circuit 13. The main control circuit 13 refers to the operating data in the first memory 14 and confirms whether the outgoing call by the key telephone set 3 is inhibited through the office line by the setting of the service class, or whether the access of the office line 5 is inhibited. When such inhibition is not imposed, the main control circuit 13 connects the office line 5 to the office line interface 11 and the key telephone set 3 to the telephone interface 9, and further operates the cross point 6 to connect the telephone interface 9 to the office line interface 11. In this manner, the connection of the key telephone set 3 to the office line 5 is completed. In addition, the main control circuit 13 indicates "busy" on the indicator LED (not shown) in the key telephone sets 2 and 3 corresponding to the office line 5.

When the calling is finished, the handset of the key telephone set 3 is hooked, to become ON-hook. This ON-hook data is fed through the telephone interface 9 and the bus 12 to the main control circuit 13. Then, the main control circuit 13 first releases the office interface 11 from the office line 5, disconnects the cross point 6, and controls to deenergize the LED (not shown) corresponding to the office line 5 of the key telephone sets 2 and 3.

The following description concerns, the case that in the flowchart in FIG. 3, the first switch $SW_1$ is closed ON, the step is branched to NO in the step of the "First Mode?", and the operating data setting operation of the second mode is set.

When the step becomes the second mode, the main control circuit 13 scans the second switch $SW_2$ in the step of the "Read $SW_2$ State". Then, the main control circuit 13 executes the step of the "$SW_2$ ON?". In this manner, if the switch $SW_2$ is closed ON, the step of the "Second Memory to First memory" is executed. More particularly, the data stored in advance in the second memory 15 is read, and is written as the operating data in the first memory 14. Thus, the key telephone system of the invention is a system which can respond to a variety of user's needs. Thereafter, the operating data is partly modified by setting newly the operating data, whereby a system which can meet the special user's need. If the operation branches to NO in the previous step "$SW_2$ ON?", the content of the first memory 14 remains as it is.

Then, the main control circuit 13 performs the step of the "Read Input" which is the step of scanning the input from the special key telephone set. Thereafter, the step of "Input Present?" is performed. When this step is branched to YES, the operating data setting step is carried out by the step of the "Setting" in accordance with the input data. When the "Setting" step is completed or the judging step of the "Input Present?" is branched to NO, the operation sequence returns to the step of "Read $SW_1$ State", and the main control circuit 13 processes again in accordance with the flowchart in FIG. 3.

Figure 4:
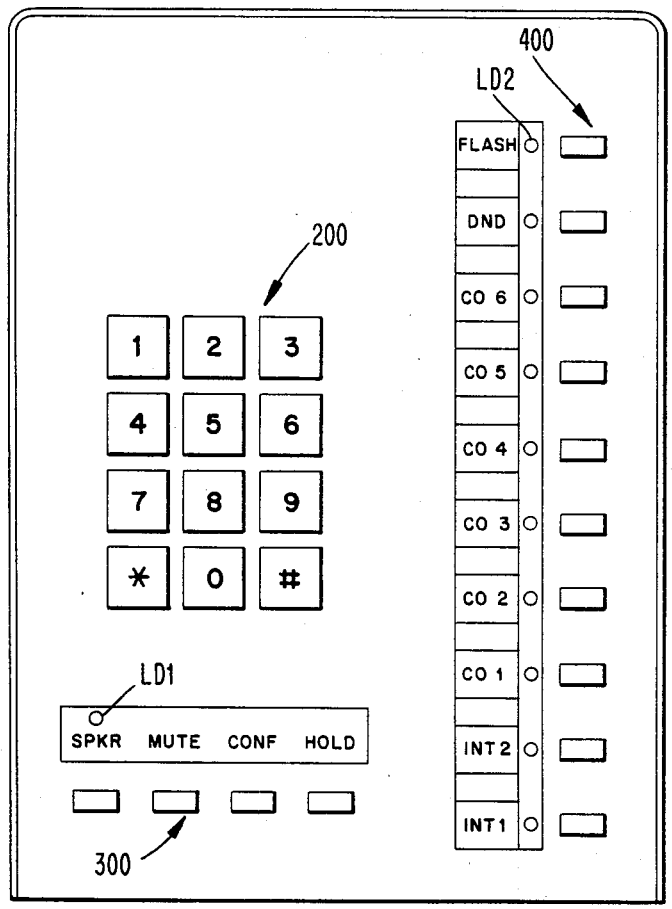
FIG. 4 is an example of a panel layout of the key telephone set.

The actual operating data setting method will be described. Before the method of setting the concrete operating method is described, the key structure of the key telephone set used in this embodiment will first be described. FIG. 4 shows the key configuration of the key telephone set used in the embodiment of this invention. In FIG. 4, the keys of the key telephone set have a first group keys which consist of numeric keys "0" to "9", and "*" and "#" keys, a second group keys consists of "SPKR", "MUTE", "CONF", and "HOLD" keys, and a third group of keys consists of ten keys, "INT1", "INT2", "COL$_1$" to "COL$_6$", "DND", and "FLASH". Further, indicators LD$_1$ and indicator group LD$_2$ of light emitting diodes respectively are arranged in the vicinities of the "SPKR" of the second group keys and of all the third group keys. Since the first group keys are similar to those used in the ordinary key telephone set, the description will be omitted, but the functions of the respective second and third group keys will be simply described as follows:

"SPKR": A key for selecting whether a call is made in the hands-free mode or not.

"MUTE": A key for selecting whether the operation of a microphone is inhibited or not in the hands-free mode.

"CONF": A key for selecting whether privacy between specific telephone sets is released or not.

"HOLD": A key for temporarily holding the office line.

"INT1", "INT2": Keys for selecting the channel of the extension.

"COL$_1$" to "COL$_6$": Keys for selecting the channel of the office line.

"DND": A key for selecting the inhibition of ringing.

"FLASH": A key for disconnecting the line for a predetermined short period of time.

The method of setting the holding ringing-back time as one of the operating data by employing the key telephone set of the construction described above will be described. The "holding ringing-back time" means to notify the holding after the elapse of the predetermined period of time by the production of a predetermined tone after the office line is maintained in holding state by pressing the "HOLD" key, and the holding ringing-back time means the period of time from the holding of the office line to the production of the predetermined tone. In this embodiment, the above-described holding ringing-back time can be arbitrarily set by employing the key of the key telephone set. The setting of the holding ringing-back time is achieved by using the keys "INT1", "INT2", and "COL$_1$" to "COL$_6$". Table 1 shows the holding ringing-back time for each key.

TABLE 1

| Key | Time |
| --- | --- |
| COL$_6$ | 160 sec. |
| COL$_5$ | 128 sec. |
| COL$_4$ | 96 sec. |
| COL$_3$ | 64 sec. |
| COL$_2$ | 48 sec. |
| COL$_1$ | 32 sec. |
| INT2 | 16 sec. |
| INT1 | no call-back. |

That is, in order to set the holding call-back time, the dial keys "0" and "5", for example, should be depressed and one of the keys in Table 1 should be depressed. By the above operation, the selected holding ringing-back time is indicated by lighting the light emitting diode in the vicinity of the keys "INT1" to "COL$_6$". Then by depressing, for example, the "HOLD" key, the writing the selected holding call back time into the first memory is executed.

An operator who intends to set the operating data first sets the first switch SW$_1$ to ON. In this manner, the step is branched to the second mode in FIG. 3. Then, the operator who intends to set the holding call-back time inputs the operating data from the predetermined key telephone set. The predetermined key telephone set does not mean the special key telephone set, but means the key telephone set which can be inputted by the main control circuit 13 when the operating data setting mode is employed. The number of the predetermined key telephone sets is not limited. In order that the main control circuit 13 may inhibit the use of the all other key telephone sets when the input from the predetermined key telephone set is applied, "a busy tone" is, for example, returned.

The operator who sets the operating data inputs the data from the predetermined key telephone set. In order to first set the call-back time, the dial keys "0" and "5" are first continuously depressed. These data are fed, for example, from the predetermined key telephone set 3 through the telephone interface 9 and the bus 12 to the main control circuit 13. Thus, the main control circuit 13 reads out the operating data for the holding call-back time set at present from the first memory 14. If it is set, for example, to 32 sec., the light emitting diode which corresponds to the key "COL" of the key telephone set is energized. Then, when the operator intends to set the holding call-back time to 48 sec., the key "COL$_2$" is depressed. Then, the data is fed through the telephone interface 9 and the bus 12 to the main control circuit 13, and the main control circuit 13 delivers a signal for controlling the energization of the diode which corresponds to the key "COL$_2$". In this manner, not only the light emitting diode which corresponds to the key "COL$_2$" is energized but the diode which corresponds to the key "COL$_1$" is deenergized.

Then, the operator confirms the selection of the 48 sec., and he depressed the key "HOLD" which instructs the write. Subsequently, the write command is fed through the telephone interface 9 and the bus 12 to the main control circuit 13. The main control circuit 13 then writes the holding ringing-back time 48 sec. to the first memory 14 in accordance with the command. In this manner, to set the holding ringing-back time, the keys "0" and "5" are first depressed, and any one of the keys "INT1" to CO6" corresponding to the desired holding ringing-back time is depressed, and the "HOLD" key is depressed.

As another example of setting the operating data, there is "an allowable line" which controls a predetermined function. In an ordinary key telephone system, calling outside of the city is restricted by means of office lines. However, in this system, such restriction may be released for some particular lines when necessary. The function of the "allowable line" serves to release the restriction only for the specific office line.

In this embodiment, figures of keys "COL$_1$" to "COL$_6$" correspond to the channel numbers of office lines in release of restriction. A method of setting to release the restriction of the office line channel 3 which corresponds to the "COL$_3$" key will be described. In this case, the switch SW$_1$ is first closed ON, thereby setting the second mode. Thereafter, the dial keys "2" and "0" are, for example, depressed, and the "COL$_3$" key is further depressed. Thus, the light emitting diode which corresponds to the "COL$_3$" key is energized. When the "HOLD" key is depressed in this state, the information for releasing the restriction in the office line corresponding to the "COL$_3$" key is stored into the first memory, and the restriction for calling the outside of city by this particular office line is released.

Further, the system of this embodiment has a function of "outgoing call restriction" which inhibits the outgoing call from a predetermined key telephone key by using the special office line. The operating data which controls this "outgoing call restriction" can be set as follows: The switch SW$_1$ is first closed ON to set the second mode. Then, the dial key "7" is, for example, depressed, the number of the key telephone set to be restricted outgoing call is depressed by the dial keys, and then the key which corresponds to the office line relative to the "outgoing call restriction of the keys "COL$_1$" to "COL$_6$" is depressed. When the "HOLD" key is depressed in this state, the operating data which controls the transmission on the predetermined office line with the predetermined key telephone set is loaded in the first memory, and the "outgoing call restriction" can be thus set.

When the setting of the operating data is completed, the first switch SW$_1$ is switched to OFF. Thus, the system is set to the first mode to complete the setting operation of the operating data.

In this manner, the operating data can be set simply without using the special equipment.

In the embodiment described above, any number of the telephone sets may be employed in which the operating data can be set. If the number of the telephone set can be limited only to one, the operator who sets the system can set the operating data from the same telephone set.

Figure 5:
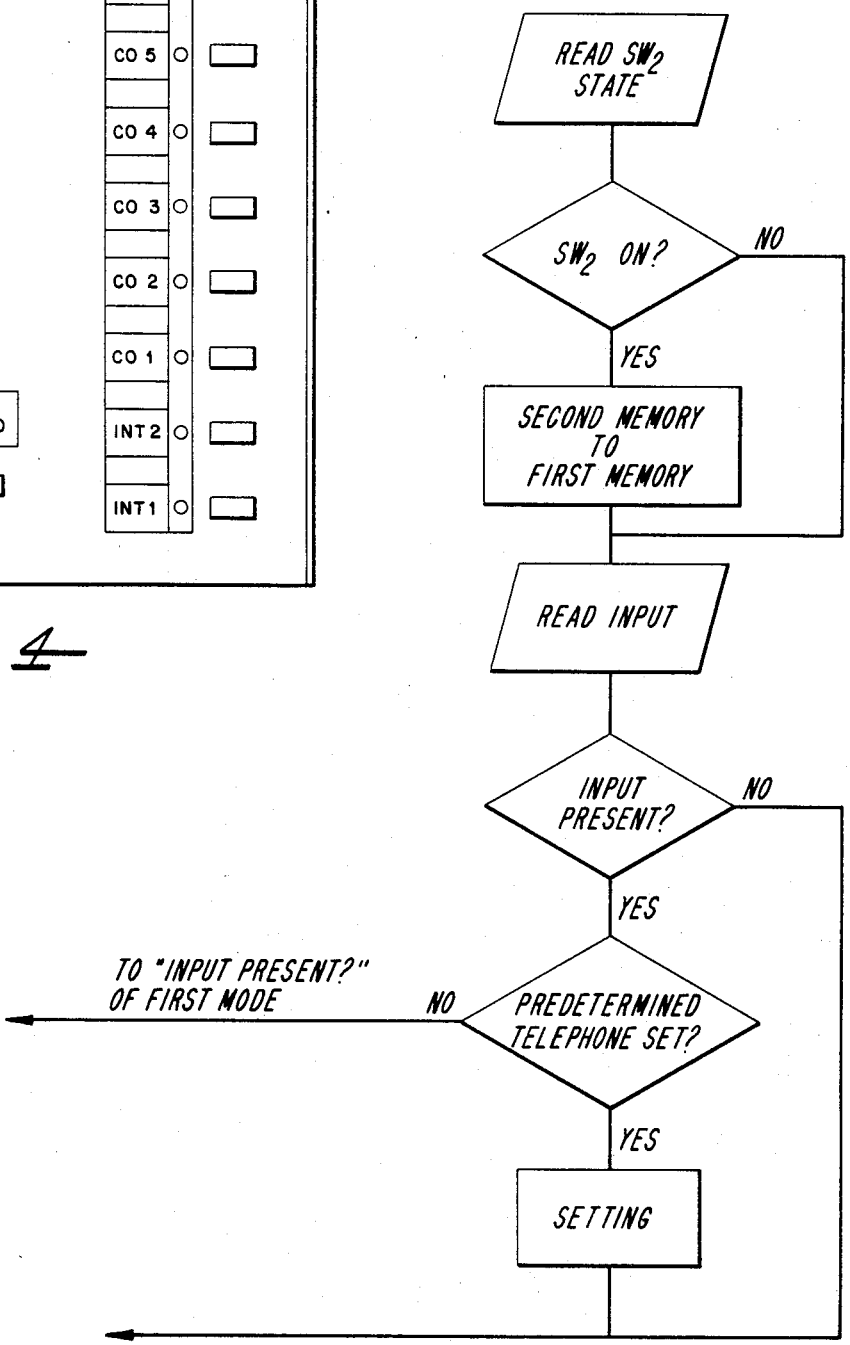
FIG. 5 is a flowchart of operational steps employed in another embodiment of the present invention.

Further, in the flowchart in FIG. 3, when the system is set to the operating data setting mode, only the input from the predetermined telephone set can be effective which is effective only for setting the operating data. However, it can also be designed to achieve the ordinary talk without inhibiting the operation of the telephone sets other than the predetermined telephone set even in the operating data setting mode. For that purpose, the flowchart of the second mode in FIG. 3 should be changed into that as in FIG. 5. More particularly, the steps of the "Read $SW_2$ State", "$SW_2$ ON?", "Second Memory To First Memory", "Read Input", "Input Present?" are not altered, but after the step of the "Input Present?" is branched to YES, the step of "Predetermined Telephone Set?" is provided. When this step is branched to YES, the system is advanced to the step of "Setting" of the second mode as it is. When this step is branched to NO, the system is advanced to the step of the "Input Present?" of the first mode as shown in FIG. 3.

In this case, it is necessary to process the following by the operation of the step of the "Initialization" before the step of the "First Mode?" of the flowchart in FIG. 3. In other words, when the ordinary mode is altered to the operating data setting mode, the deenergization of the predetermined telephone set and the disconnection of the line during busy are achieved. When the operating data setting mode is altered to the ordinary operation mode, if the other telephone set is busy, the light emitting diode which corresponds to the office line is indicated.

When the operating data are set from the predetermined telephone set, the ringing from the telephone set except the predetermined telephone set is inhibited, and busy tone is returned, for example, to the ringing operator.

As described above, even when system is set to the operating data setting mode by closing the first switch $SW_1$ ON, other telephone sets can achieve ordinary operation, thereby further improving the operability.

In the embodiment described above, the foregoing description relates to the operation in which the operating data are set by using the office line selection key, extension selection key, or dial key at the time of setting the operating data. However, how to use the keys of the key telephone set is not contained in the scope of the present invention, but can be free. However, it is necessary to employ the certain telephone set of the key telephones of the system as the predetermined telephones set without using the special key telephone set.

Further, the switches $SW_1$, $SW_2$ are not always necessary. In other words, when the system is constructed to produce a command which switches between the first mode and the second mode from the predetermined key telephone set and a command which transfers the content of the second memory to the first memory, the switches $SW_1$, $SW_2$ may be removed. When the system is constructed to inhibit the writing operation of the first memory when the switch $SW_1$ is opened OFF, the content of the first memory can be fixed in a hardware manner, and the operating data can be stabilized.

What is claimed is:

1. A key telephone system comprising:
   a main unit connected to a plurality of office lines;
   a plurality of key telephone sets connected to said main unit and having keys for performing a variety of operations;
   first memory provided in said main unit for storing operating data for restricting a function or adding a different function of said respective key telephone sets and for controlling the operation of the entire system;
   writing means for writing said operating data in said first memory by employing the keys of said key telephone sets; and
   control means provided in said main unit for controlling the connection between said respective key telephone sets, the connection between said respective key telephone sets and said office lines, the operations of said respective key telephone sets and the operation of the entire system in accordance with the operating data stored in said first memory.

2. A key telephone system as claimed in claim 1, further comprising: switching means for switching from a first mode of operation to a second mode of operation, said connection and said control by said control means being performed in said first mode of operation, and writing of said operating data in said first memory by said writing means being performed in said second mode of operation.

3. A key telephone system as claimed in claim 2, wherein said first mode of operation and said second mode of operation are selected for each key telephone set by said switching means.

4. A key telephone system as claimed in claim 3, wherein the writing of the operating data in said first memory by said writing means is performed by using the keys of any one of a plurality of key telephone sets, and only said any one key telephone set is switched to said second mode of operation.

5. A key telephone system as claimed in claim 2, wherein switching from said first mode of operation to said second mode of operation is performed by said switching means in response to a command from said key telephone set.

6. A key telephone system as claimed in claim 2, wherein said switching means comprises a first switch for switching modes, switching between said first mode of operation and said second mode of operation being performed by said control means in response to the operating state of said first switch.

7. A key telephone system as claimed in claim 6, further comprising: a second memory for storing the predetermined operating data and transfer means for transferring the operating data stored in said second memory into said first memory.

8. A key telephone system as claimed in claim 7, wherein said first memory comprises a random access memory and said second memory comprises a read-only memory.

9. A key telephone system as claimed in claim 7, wherein said transfer means comprises a second switch, said transfer means transferring the operating data stored in said second memory into said first memory when said second switch is operated under the conditions that said second mode of operation is selected by said first switch.

10. A key telephone system as claimed in claim 7, wherein said transfer means comprises a second switch, said transfer means transferring the operating data stored in said second memory into said first memory when said first mode of operation is selected by said first switch under the condition that said second switch is operated.

11. A key telephone system as claimed in claim 6, wherein said first switch inhibits said writing operation into said first memory by the output of said first switch when said first switch is in the operating state corresponding to said first mode of operation.

12. A key telephone system as claimed in claim 6, wherein the switching between said first mode of operation and said second mode of operation by said switching means is achieved for a predetermined key telephone set.

13. A key telephone system as claimed in claim 12, wherein the writing of the operating data in said first memory by said writing means is performed by using the keys of said predetermined key telephone set.

14. A key telephone system as claimed in claim 2, wherein the writing of said operating data in said first memory by said writing means is performed by using the keys of any one of a plurality of key telephone sets, and all key telephone sets are switched to said second mode of operation.

15. A key telephone system as claimed in claim 2, wherein the writing of the operating data in said first memory by said writing means is performed by using the keys of a predetermined key telephone set, and all said key telephone sets are switched to said second mode of operation.

16. A key telephone system as claimed in claim 2, wherein the writing of the operating data in said first memory by said writing means is performed by using the keys of a predetermined key telephone set, and only said predetermined key telephone set is switched to said second mode of operation.

17. A key telephone system as claimed in claim 1, wherein the writing of the operating data in said first memory by said writing means is performed by depression of of a combination a plurality of predetermined keys of said key telephone set.

18. A method of setting operating data in a key telephone system having a main unit connected to a plurality of office lines, a plurality of key telephone sets connected to said main unit and each having a plurality of keys for operating a variety of operations, first memory provided in said main unit for storing operating data for restricting a function or adding a different function of said respective key telephone sets and for controlling the operation of the entire key telephone system, and control means provided in said main unit for controlling the connections between said respective key telephone sets and connections between said respective key telephone sets and said respective office lines, and the operations of said respective key telephone sets and the entire key telephone system in accordance with the operating data stored in said first memory, comprising the step of writing said operating data in said first memory by the depression of a combination of a plurality of a predetermined keys of any of said key telephone sets.

19. A method of setting operating data in a key telephone system having a plurality of key telephone sets and a main unit wherein said main unit has a first switch for switching between an ordinary operation mode and an operating data setting mode, a first memory for storing the operating data, and a main control circuit, said main control circuit detecting the state of said first switch, storing as the operating data the data inputted by the operation of a predetermined key telephone set in said first memory in the operating data setting mode when said first switch is ON (OFF) and controlling the operation in accordance with the operating data stored in said first memory in the ordinary operation mode when said first switch is OFF (ON).

20. A method of setting operating data in a key telephone system having a plurality of key telephone sets and a main unit, wherein said main unit has a first switch for switching between an ordinary operation mode and an operating date setting mode, a first memory for storing the operating data, a second memory for storing preset data, a second switch for transferring the data stored in said second memory into said first memory, and a main control circuit, said main control circuit detecting the states of said first and second switches, storing as the operating data the data inputted by the operation of a predetermined key telephone set in said first memory in the operating data mode when said first switch is ON (OFF), transferring as the operating data the data stored in said second memory into said first memory in accordance with the operation of said second switch, and controlling the operation in accordance with the operating data stored in said first memory in the ordinary operation mode when said first switch is OFF(ON).

* * * * *